United States Patent

Roldan et al.

[11] 3,923,820
[45] Dec. 2, 1975

[54] METHOD OF OBTAINING 3,5 DI-METHYLBENZAMID SUBSTITUTES

[75] Inventors: Cristobal Martinez Roldan; Miguel Fernandez Brana; Jose Maria Castellano Berlanga, all of Madrid, Spain

[73] Assignee: Laboratorios Made, S.A., Madrid, Spain

[22] Filed: Apr. 8, 1974

[21] Appl. No.: 458,893

[52] U.S. Cl................ 260/295 AM; 260/295.5 A
[51] Int. Cl.[2]......................................... C07D 213/06
[58] Field of Search .............. 260/295 AM, 295.5 A

[56] References Cited
UNITED STATES PATENTS

| | | | |
|---|---|---|---|
| 3,367,940 | 2/1968 | Hotten........................... | 260/295 AM |
| 3,455,940 | 7/1969 | Stecker......................... | 260/295 AM |
| 3,509,166 | 4/1970 | Wright, Jr. et al. .......... | 260/295 AM |

OTHER PUBLICATIONS

Klingsberg, Pyridine and Its Derivatives Part 3, pp. 149, 150, 169, 170.

Primary Examiner—Norman A. Drezin
Attorney, Agent, or Firm—Woodhams, Blanchard and Flynn

[57] ABSTRACT

Compounds having the formula

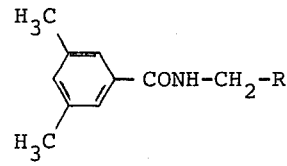

in which R is 2-pyridyl, 3-pyridyl or 4-pyridyl. The compounds are prepared by reacting 3,5-dimethylbenzoic acid functional derivatives with picolylamines. The compounds possess tranquilizing, adrenalytic, anti-inflammatory and spasmolytic properties.

4 Claims, No Drawings

METHOD OF OBTAINING 3,5 DI-METHYLBENZAMID SUBSTITUTES

The object of this invention is to provide 3,5-dimethylbenzamide derivatives, which show a marked activity as anti-inflammatories, anti-convulsivants and as psycho-medicaments curbing the spontaneous activity in mice.

These compounds have the formula:

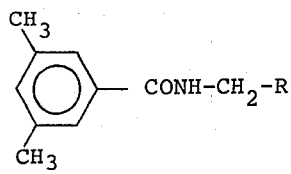

where R is pyridyl.

The general synthesis method of these products is based on the reaction of an activated derivative of the acid, as an anhydride of same, with the corresponding amine, directly or in presence of an organic or inorganic base, isolating the salt that is obtained as such by direct reaction or treating with a base having characteristics similar to those mentioned above to obtain the free compound, and purifying the products obtained by crystallization in the midst of a suitable solvent.

Below are some non-limitative examples of the scope of this invention.

EXAMPLE 1

In a double mouth 100 ml. capacity matrass, fitted with an electro-magnetic shaker, reflux refrigerant with calcium chloride tube and key funnel, put 5 g. (0.03 moles) of 3,5-dimethylbenzoyl chloride dissolved in 20 ml. of dry benzene. To this solution, and using the key funnel, drop by drop and with shaking add 3.4 g (0.03 mols) of 2-picolylamine, dissolved in 10 ml. of dry benzene. The reaction is exothermal and during the addition a white precipitate is formed. Once this has been completed, keep shaking for two hours. After this period, filter the solid that has formed and dissolve in water. The watery solution is alkalized with 10% soda and an oil is formed that congeals on cooling. The solid that has formed is filtered and crystallized in cyclohexane. The N-(2-picolyl)-3,5-dimethylbenzamide is a white solid of B.P. = 71°–73°C (uncorrected).

Analysis:
Calculated for $C_{15}H_{16}N_2O$:
C = 74.97%; H = 6.71%; N = 11.65%.
Found: C = 75.09%; H = 6.84%; N = 11.82%.
Chlorhydrate B.P. = 178°–180°C.

EXAMPLE 2

In a double mouth 100 ml. capacity matrass, fitted with electro-magnetic shaker, reflux refrigerant with calcium chloride tube and key funnel, put 5 g. (0.03 mols) of 3,5-dimethylbenzoyl chloride dissolved in 20 ml of dry chloroform. To this solution, and using the key funnel, drop by drop and shaking, add 3.4 g (0.03 mols) of 3-picolylamine, dissolved in 10 ml. of dry chloroform. The reaction is exothermal and during the addition, a yellowish white precipitate is formed. Once this has been completed, keep shaking for two hours. After this period, filter the solid that has formed and dissolve in water. The watery solution is alkalized with 10% soda and an oil is formed that congeals on cooling. Filter the solid that has formed and crystallize in a mixture of benzene-petroleum ether in the usual way. The N-(3-picolyl)-3,5-dimethylbenzamide is a white solid of B.P. = 91°–2°C (uncorrected).

Analysis: Calculated for $C_{15}H_{16}N_2O$: C = 74.97%; H = 6.71%; N = 11.65%. Found: C = 74.92%; H = 6.75%; N = 11.69%.

EXAMPLE 3

In a double mouth 250 ml. capacity matrass, fitted with electro-magnetic shaker, thermometer, calcium chloride tube and refrigerant bath (ice-salt) put 7.5 g (0.05 mols) of 3,5-dimethylbenzoic acid dissolved in 50 ml. of dry acetone and 5 g. (0.05 mols) of triethylamine. Start to shake and when the temperature reaches −10°C, slowly add 5.4 g. (0.05 mols) of ethyl chlorocarbonate, ascertaining that the temperature does not exceed 0 °C. When the addition has been completed, keep shaking at −10°C for one hour, and after same add at one go 5.4 gr. (0.05 mols) of 3-picolylamine in 25 ml. of water. Leave for another hour. Evaporate the acetone and an oil mixture of the two bases appears. The triethylamine is eliminated by distillation in a vacuum evaporator and the residue, after crystallizing, has physical constants that correspond with those described in the above example.

EXAMPLE 4

In a 100 ml. capacity matrass, fitted with reflux refrigerant with calcium chloride pipe, put 1.0 g. (0.01 mols) of 3-picolylamine, 2.8 g (0.01 mols) of 3,5-dimethylbenzoic acid anhydride and 20 ml. of dry chloroform and boil on reflux for one hour. After this time, leave to cool and wash the reaction mixture with five per cent sodium bicarbonate solution, with water, and finally dry with anhydrous magnesium sulphate. Once the solvent has been eliminated, a solid is obtained which after crystallizing, has physical constants that correspond with those described in example 3.

EXAMPLE 5

In a double mouth 100 ml. capacity matrass, fitted with electro-magnetic shaker, reflux refrigerant with calcium chloride tube and key funnel, put 5 gr. (0.03 mols) of 3,5-dimethylbenzoyl chloride dissolved in 20 ml. of dry acetone. To this solution add via the key funnel, drop by drop and with shaking, 3.4 g (0,03 mols) of 4-picolylamine dissolved in 10 ml of dry acetone. The reaction is exothermal and during the addition, a yellowish white precipitate is formed. When this has been completed, it is kept shaken for two hours. After this the solid that has formed is filtered and dissolved in water. The watery solution is alkalized with 10% soda and a paste-like compound is formed, which is filtered and crystallized with a mixture of benzene-petroleum ether in the usual way. The N-(4-picolyl)-3,5-dimethylbenzamide is a white solid of B.P. = 104°–6°C.

Analysis: Calculated for $C_{15}H_{16}N_2O$: C = 74.97%; H = 6.71%; N = 11.65%. Found: C = 74.71%; H = 6.52%; N = 11.75%.

Pharmacology of the Three Derivatives of the 3-5 Dimethylbenzoic Acid

1. Acute Toxicity

Following the method of Litchfield-Wilcoson, the acute toxicity has been made in albino mice:

|  |  | DL₅₀ |
|---|---|---|
| N-2 picolyl | 383 | mg/kg |
| N-3 picolyl = | 296,3 | mg/kg |
| N-4 picolyl | 266 | mg/kg |

2. Irwing's Diagram

Administering the medicaments intraperiotoneally, at a dose of 2.5 mg. in albino I.C.R. Swiss mice, no modification in the parameters has been observed, and which are studied in Irwing's diagram with the N-2 picolyl. On the other hand, the N-3 picolyl and N-4 picolyl show an inhibition of the motor activity, especially in spontaneous motility and reactivity. The action is more intense and at the same time more fleeting with the N-4 picolyl.

3. Arterial Pressure of Rat

In rat anaesthetized with sodium pentobarbital, the N-2 at the rate of 30 mg/kg does not produce any modification in the responses to adrenalin and noradrenalin, but on the other hand, the N-3 and N-4, although not modifying the responses to noradrenalin, produce an intense inhibition of the responses to adrenalin.

4. Analgesic Action

The analgesic action has been tested with the Hot plate test at 55°C, in albino, I.C.R. swiss mice. Our synthesis products have been administered at a rate of 60 mg/kg. of weight, intraperitoneally. No thermal analgesic action whatsoever has been seen with, any of the products tested.

5. Study of the Anti-convulsivant Action

The action of the three products of synthesis has been tested in the light of the convulsions in mouse, provoked by strychnine (1.5 mg/kg i,p,), cardiazol (40,5 mg/kg i.p.) and glutaramide (20,1 mg/kg i.p.) The synthesis products have been administered at a rate of 60 mg/kg. weight and after 30 minutes the convulsivant medicaments have been injected. The number of animals protected from the convulsions and the number of dead animals have been assessed, and our medicaments have not modified any of these parameters studied.

6. Potentiation of the Hypnotic Action of Barbiturics

Four batches of I.C.R. Swiss mice have been made, with 20 animals in each batch. The N-2, N-3 and N-4 have been injected at a rate of 60 mg/kg, intraperitoneally, and after 30 minutes, sodium pentobarbital (50 mg/kg i.p.). A batch of control animals has also been made, which were only injected with sodium pentobarbital. The three synthesis medicaments potentiate the hypnotic action of the pentobarbital. The action is more intense, the more the nitrogen atom of the pyridyl is separated from the amide group.

7. Study of the Anti-inflammatory Action

The pletismographic method with inflammations provoked by ovoalbumin and carragenin has been used. Wistar 200 gr. weight rats have been used. The substances provoking the inflammation, ovoalbumin and carragenin, have been injected by plantar subcutaneous means in a volume of 0.1 ml. The problem products have been injected intraperitoneally at the rate of 50 mg/kg. The N-2 and N-3 have no anti-inflammatory activity. However, the N-4 inhibits and in a very significant way, the plantar edema provoked by carragenin and ovoalbumin.

8. Isolated Ileum of Guinea Pig

Using Tyrode nutrient liquid at 37°C, the N-2 and N-3 produce a discrete inhibition of the responses to acetylcholine and histamine, when doses of 100 meg/ml. are used. The N-4 does not possess this action. It should be mentioned that this inhibition has a scanty magnitude.

9. Spasmolytic Activity

Spasms have been provoked with 0.08 mg/ml of barium chloride in the jejunum of rabbit and ileum of guinea pig. Both organs have been dissicated and mounted using the normal techniques and employing Tyrede at 37°C as nutrient liquid. The N-2 has no action whatsoever. The N-3 and N-4 inhibit the spasms in both techniques used. The action is more intense in the N-4 than in the isolated jejunum of rabbit, and at the doses of 10 meg/ml. it has the same spasmolytic activity as the prifinium bromide at the same doses.

SUMMARY

These are three synthesis products, whose activity and toxicity increase as the N of the pyridyl is separated from the amide group, with emphasis on tranquilizer, adrenalytic, anti-inflammatory and spasmolythic properties.

We claim:

1. A compound having the formula

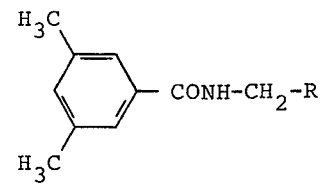

wherein R is 2-pyridyl, 3-pyridyl or 4-pyridyl.

2. A compound according to claim 1, wherein R is 2-pyridyl.

3. A compound according to claim 1, wherein R is 3-pyridyl.

4. A compound according to claim 1, wherein R is 4-pyridyl.

* * * * *